United States Patent [19]

Kowalski

[11] Patent Number: 4,654,655
[45] Date of Patent: Mar. 31, 1987

[54] MULTI-USER SERIAL DATA BUS

[75] Inventor: Joseph L. Kowalski, Fox River Grove, Ill.

[73] Assignee: Motorola, Inc., Schaumburg, Ill.

[21] Appl. No.: 585,753

[22] Filed: Mar. 2, 1984

[51] Int. Cl.⁴ .............................................. H04Q 9/00
[52] U.S. Cl. .................... 340/825.5; 455/78; 370/85
[58] Field of Search .......... 340/825.5, 825.52, 825.51; 370/85, 91–93; 455/78, 14; 179/41 A

[56] References Cited

U.S. PATENT DOCUMENTS

| | | | |
|---|---|---|---|
| 3,351,714 | 11/1967 | Kunzelman et al. | 179/41 |
| 3,898,390 | 8/1975 | Wells et al. | 179/41 A |
| 4,099,028 | 7/1978 | Townson, IV | 370/93 |
| 4,359,731 | 11/1982 | Beauford et al. | 340/825.51 |
| 4,369,516 | 1/1983 | Byrns | 375/110 |
| 4,373,183 | 2/1983 | Means et al. | 340/825.5 |
| 4,390,963 | 6/1983 | Puhl et al. | 364/900 |
| 4,398,265 | 8/1983 | Puhl et al. | 364/900 |
| 4,486,624 | 12/1984 | Puhl et al. | 179/2 EB |
| 4,486,750 | 12/1984 | Aoki | 340/825.14 |
| 4,498,169 | 2/1985 | Rozmus | 370/85 |
| 4,519,069 | 8/1985 | Pudsey | 370/85 |
| 4,546,450 | 10/1985 | Kanuma | 340/825.51 |
| 4,570,257 | 2/1986 | Olson et al. | 370/85 |

FOREIGN PATENT DOCUMENTS 0051332 6/1982 European Pat. Off. .

Primary Examiner—Donald J. Yusko
Attorney, Agent, or Firm—Rolland R. Hackbart

[57] ABSTRACT

A multiple device serial data bus and signalling scheme is described. The serial data bus allows for inter-peripheral communication at a data rate established by a bus control unit. Clocking information is extracted from data communicated from the bus controller to the peripheral devices. Additional conductors for clock information are not required. In addition an arbitration scheme is provided to eliminate bus contention if several units request service simultaneously. The multiple device serial data bus is utilized on an as required basis and may communicate information at a variety of data rates.

13 Claims, 13 Drawing Figures

Fig. 3a

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| R/W | (A3) | A2 | A1 | A0 | (X2) | X1 | (X0) | (D7) | D6 | D5 | D4 | D3 | D2 | D1 | (D0) |

(DESTINATION ADDRESS) (CONTROL BITS) (DATA FIELD)

← FIRST DATA BIT SENT BY BUS CONTROLLER.

SERIAL DATA WORD ON TD/CD LINES.

Fig. 3b

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| (SA3) | SA2 | SA1 | SA0 | (DA3) | DA2 | DA1 | DA0 | (D7) | D6 | D5 | D4 | D3 | D2 | D1 | (D0) |

(SOURCE ADDRESS) (DESTINATION ADDRESS) (DATA FIELD)

← FIRST BIT SENT ON THE BUS.

SERIAL DATA WORD ON RD LINE.

Fig. 3c

| B15 | B14 | B13 | B12 | B11 | B10 | B9 | B8 | B7 | B6 | B5 | B4 | B3 | B2 | B1 | B0 |
|---|---|---|---|---|---|---|---|---|---|---|---|---|---|---|---|
| (SA3) | SA2 | SA1 | SA0 | (DA2) | DA1 | DA0 | (X0) | (D7) | D6 | D5 | D4 | D3 | D2 | D1 | (D0) |

(SOURCE ADDRESS) (DESTINATION) (REGISTER) (DATA FIELD)
(ADDRESS) (CONTROL)

SERIAL DATA WORD ON RD LINE FOR MESSAGE FROM OPTION TO HANDSET.

MULTI-USER SERIAL DATA BUS

BACKGROUND OF THE INVENTION

1. Field of the Invention

This invention relates to the field of data communications and specifically to a serial data bus system which provides for inter-device communications on a three wire serial data bus. Data communication bus structures of this type may be utilized in vehicular communication systems which employ one or more peripheral devices, in conjunction with a controller, to provide both multi-user and multi-function access to the vehicular communication system.

2. Description of the Prior Art

Early vehicular communication systems appeared in the form of simple "car telephone" systems which were capable of operating on a single frequency. The operating frequency of this type of system was manually controlled either by a system dispatcher or the user in a vehicle. A system of this type allowed a single user with a single handset to communicate with a dispatcher or base site. A more advanced vehicular communications system is described in U.S. Pat. No. 3,351,714 entitled "Mobile Radio Telephone Apparatus" by R. C. Kunzelman et.al., issued Nov. 7, 1964. This type of vehicular communications system provides automatic channel assignment and includes an improved method of signalling the vehicular units, however, this vehicular system is also limited to a single user with a single handset per vehicular unit.

Recently, vehicular communications systems have developed to allow automatic multiple frequency use by the vehicular unit. A vehicular system of this type is refered to as a cellular mobile telephone system and provides for a dramatically increased capacity for users by virtue of the frequency reuse characteristic. One type of cellular mobile communication system is described in U.S. Pat. No. 3,898,390 entitled "Multiple Zone Communications System and Method" by Wells et al., issued Aug. 5, 1975. Cellular mobile telephone vehicular systems have created new applications for vehicular communications wherein several perpherial may be used along with the usual single user handset. Conventional cellular vehicular communication systems operate with a handset and cradle (referred to as a control head) which communicates with the control unit and associated transceiver. The control unit and transceiver are typically located some distance from the control head, usually being located in the trunk of the vehicle. The control unit and control head are coupled through a control cable which unifies the operation of the vehicular communication unit. Conventional control cables utilize as many as eight individual control wires and are adapted for coupling only a single control head and a single control unit and transceiver. One scheme which has reduced the number of conductors required for a control cable is described in U.S. Pat. No. 4,369,516 entitled Self-Clocking Data Transmission System by John P. Byrns, issued Jan. 18, 1983 and assigned to the assignee of the present invention. The self-clocking data bus allows for data transmission between a control unit and control head without additional conductors being required for synchronization and framming of the data. This self-clocking data transmission system can be utilized with a single handset and control unit, however, no provision is made for multiple units which attempt to place data on the data bus simultaneously. Perpherial devices which could be utilized in a system of this type include auto-dialers, hands-free handset controllers, etc. No data communications bus structure exists which provides for multiple prepherial and handset utilization of a common bus structure while further providing arbitration on a three-wire bus type structure, if several units on the serial bus request service simultaneously.

SUMMARY OF THE INVENTION

Accordingly, it is an object of the present invention to provide a serial data bus structure and signalling scheme which allows multiple perpherial communication on the serial bus.

It is yet another object of the present invention to provide a multiple perpherial serial data bus structure and signalling scheme which allows for communication between a control unit, one or more handsets, and on or more other perpherial devices on the serial bus.

It is still another object of the present invention to provide a multiple perpherial bus structure which allows for inter-perpherial communication on the bus.

It is still another object of the present invention to provide a mulitple perpherial data bus structure and signalling scheme wherein priority assignments arbitrate bus contention if two units request control of the bus simultaneously.

According to the preferred practice of the present invention, a data clock signal is derived from activity on certain of the data lines. Each handset or peripheral is assigned a device address. A handset or peripheral device gains control of the bus by first requesting service from a bus control unit. Service is preferably requested by forcing one of the bus conductors low. If more than one unit has requested service, the address of each unit is placed on the bus bit by bit and each unit reads the data present on the bus. If a higher priority unit is detected, the lower priority unit will release the bus and remain in a wait state until the present transmission is completed. According to the principles of the present invention, all clocking information is derived from data transitons on the bus and therefore the bus is not data rate dependant. Furthermore, the bus does not require continuous data activity and will only place data on the bus as required.

BRIEF DESCRIPTION OF THE DRAWINGS

FIGS. 3a through 3c show the signalling scheme which unifies the operation of the control unit, the control head, and peripherals which communicate on the data bus of the present invention.

DETAILED DESCRIPTION OF THE PREFERRED EMBODIMENT

Figure 1:
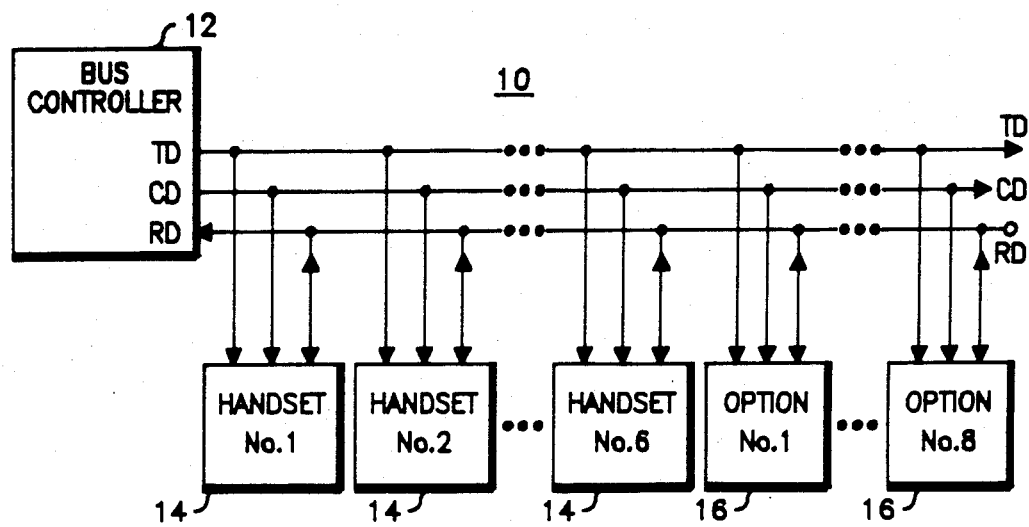
FIG. 1 is a block diagram of the vehicular data bus system of the present invention.

FIG. 1 shows a block diagram of the vehicular data bus structure of the present invention. According to FIG. 1, the multiple user searial data bus system 10 includes a bus controller 12 which provides clocking and control information to a plurality of handsets 14 or peripheral devices 16. The present invention provides for communication from a handset or peripheral to the bus control unit as well as from a handset or peripheral to another handset or peripheral. The multiple user serial data bus comprises three lines designated TD, CD, and RD. The TD and RD lines are used to communicate clocking information on the bus as well as providing a data channel for sending data from the bus controller to the various handsets and peripheral devices. An RD line is provided for a data path from a handset or peripheral device to the bus controller, or other peripheral device.

Figure 2:
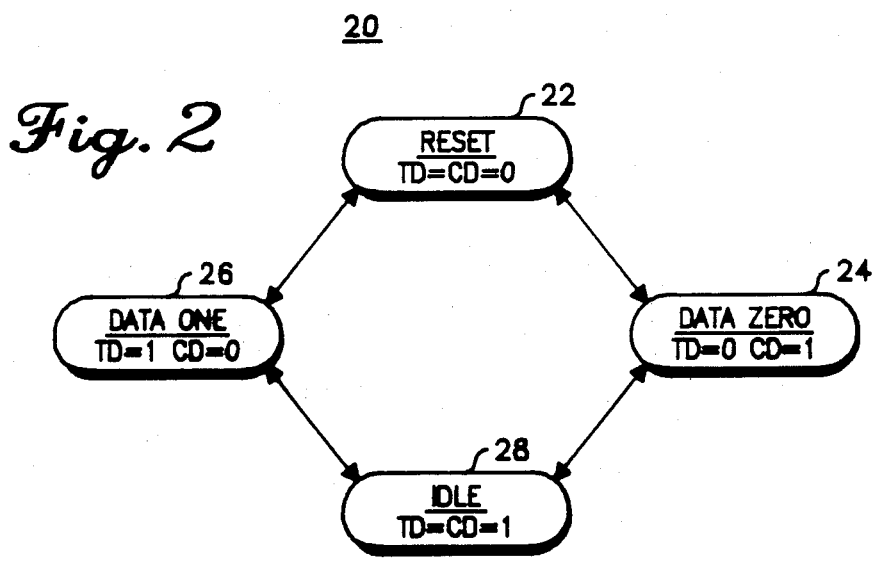
FIG. 2 is a flow diagram detailing the operation of the data transmission scheme used in accordance with the present invention.

FIG. 2 shows a state diagram detailing the clock recovery algorithm and state assignment of the date bus lines TD and CD of the present invention. According to FIG. 2, the data bus lines TD and CD begin in a reset state with both lines being equivalent to a binary zero. Therefore, state 22 indicates the bus is currently reset. The TD and CD lines can then shift to state 26 or 24 which indicates either a binary one or zero as shown in FIG. 2. The TD and CD lines will then both go high simultaneously to state 28, indicating an idle conditon, state 28, on the bus. The data transition on the TD and CD lines will continue in accordance with this scheme until all data is sent. The bus will then return to the reset state until another data transmission is required. The exact data clocking transmission format is further described in U.S. Pat. No. 4,369,516 entitled "Self-Clocking Data Transmission System" by John P. Byrns, issued Jan. 18, 1983, and assigned to the assignee of the present invention. The present invention provides a signalling system and arbitration scheme which unifies communication of several handsets or peripheral devices commonly using the data clock recovery scheme described in the Byrns patent mentioned above.

FIGS. 3a through 3c show the signalling scheme which unifies the operation of the control unit, the control head, and a number of peripheral units which communicate on the data bus of the present invention. According to the principles of the present invention, data placed on the serial bus lines is organized in groups of sixteen bits. When data is to be commuicated on the bus, the TD and CD lines provide clocking information as well as a data path which communicates data from the bus controller to the various handsets or peripheral devices. Each of the devices which utilize the serial data bus are assigned a four bit address which also corresponds to a predetermined priority for that unit. The priority assignments are used to determine which unit will get service on the bus if several handsets or peripheral devices request service simultaneously. It should be noted that the signalling scheme of the present invention does not require continuous clocking on the serial data bus and the signalling scheme here described is not data rate dependent. Since clocking information is directly derived from the data present on the TD and CD lines, the bus control unit can variably alter the data rate during data communications if desired. The bus control unit is assigned an address which corresponds to the highest priority unit on the bus. The primary handset used on the bus is assigned the next highest priority. The bus addresses are organized in groups so that any handset on the bus will have a higher priority than any peripheral device on the bus. The preferred address assignments used in accordance with the preferred embodiment of the present are shown below in Table 1.

TABLE 1

| Address | Unit | Priority |
|---------|------|----------|
| 0000 | Controller | Highest |
| 0001 | Handset #1 | |
| . | . | |
| . | . | |
| . | . | |
| 0110 | Handset #6 | |
| 0111 | Handset All | Call |
| 1000 | Option #1 | |
| . | | |
| . | | |
| 1111 | Option #8 | Lowest |

Refering now to FIG. 3a, there is shown the signalling format for a sixteen bit data packet which would be communicated from the bus controller to the handsets or peripheral devices using the TD and CD lines of the serial data bus. According to FIG. 3a, the first bit (B15) of the data packet comprises a read/write bit which indicates that the bus controller is ready to either send data to or answer a request for service from the handsets and peripheral devices. The next four bits (B14-B11), referred to as destination bits, indicate the address of the unit which is to communicate with the bus controller. The desination bits are followed by three control bits (B10-B8) which indicate a register within the handset or peripheral which will be accessed by the bus controller. The registers within a handset or peripheral may contain such information as a desired phone number, frequency or channel information or other such information. The control bits are followed by eight data bits (B7-B0) which are to be communicated between devices.

FIGS. 3b shows the signalling format for the serial data bus line RD when information is to be communicated from a handset or peripheral device to the bus control unit. When information is to be sent from a handset or peripheral device to the bus control unit, the serial bus lines TD and CD toggle between data states 24 or 26 and idle states 28 in FIG. 2 to provide clocking information to the handset or peripheral device sending data. The TD and CD lines will continue to toggle for the duration of the sixteen bit message. When the sixteen bit message has been completed, the TD and CD lines will revert to the reset state 22 until another handset or peripheral device requests service on the bus. Refering now to FIG. 3b, there is shown the signalling scheme used to communicate information on the RD line from a handset or peripheral device to the bus controller or between peripheral units. The first four bits of the sixteen bit data packet (B15-B11) comprises the address (referred to as the source address) of the device requesting service on the bus. The source address serves two purposes. The source address identifies the device requesting service of the bus as well as providing the means for arbitration if two units request service of the bus simultaneously. The arbitration process will be discussed in more detail later. The source address bits are followed by a four bit address (B11-B8), referred to as the destination address, which indicate the device intended to receive the following data field. The next eight bits (B7–B0) comprise the data field, which is to be communicated between devices.

Refering now to FIG. 3c, there is shown an alternate signalling format which could be used to communicate information on the bus from a peripheral device to a handset. According to FIG. 3c, the first four bits (B15–B11) comprise the source address of the data to be placed of the bus. The source address bits are followed by a three bit destination address (B11–B9) and a one bit register control B8. Since this signalling stream is used for communication between a peripheral device and a handset, a four bit destination address is not required, and therefore, a single bit (B8) is reserved to select a destination register within a handset. The destination bits and register control bits are then followed by an eight bit data field (B7–B0) comprising the data to be communicated from the peripheral to the handset. As mentioned earlier, whenever a data packet has been communicated on the bus, the bus conductors TD, CD, and RD will return to an idle state until service is again required on the bus.

Figure 4:
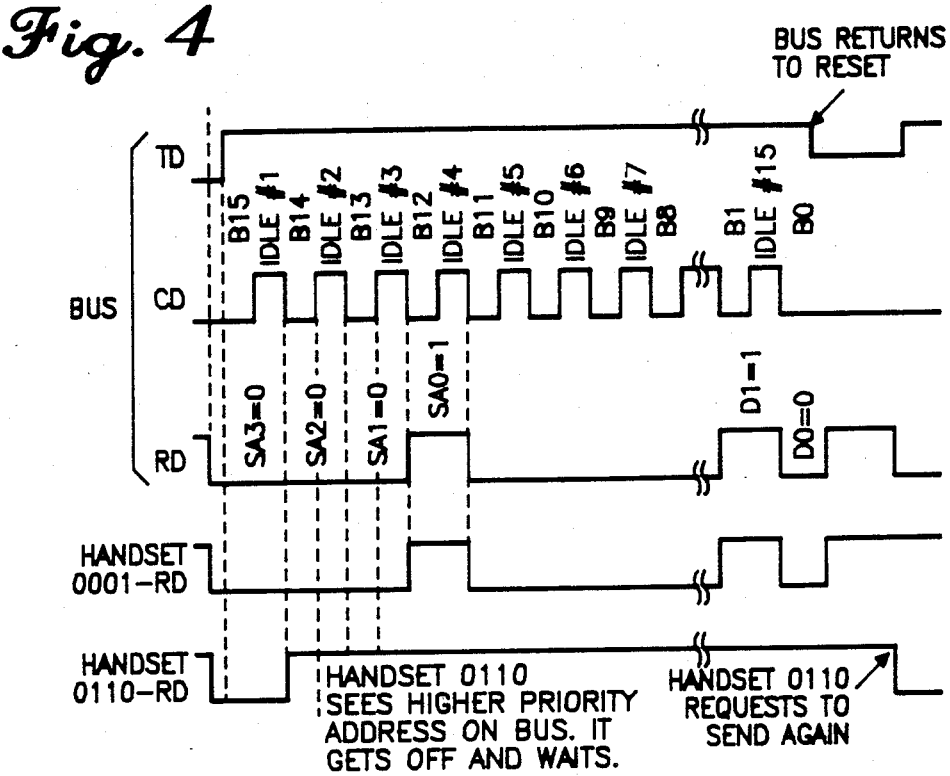
FIG. 4 is a timing diagram which details the operation of a handset or peripheral device while requesting control of the data bus.

Refering now to FIG. 4, there is shown a timing diagram which details the operation of the bus while a handset or peripheral device requests service on the bus. Shown in FIG. 4 are the TD, CD, and RD lines as well as two handsets with source address designations 0001 and 0110 respectively. According to FIG. 4, the TD and CD lines are initially in a reset state, that is both are initially inactive. The reset condition of the RD line is indicated as normally high. A handset or peripheral device requests service on the bus by pulling the RD line low. The timing diagram of FIG. 4 shows a situation wherein two devices have requested service on the bus simultaneously. When the bus control unit 12 of FIG. 1 senses the RD line has been pulled low, it begins clocking the bus by setting the TD line high and toggling the CD line. Clocking information could also be transmitted on the bus by setting the CD line high and toggling the TD line or by alternately toggling the CD and TD lines. When the clocking information appears on the bus, the handsets or peripheral devices begin placing their particular source address on the RD line of the bus substantially simultaneously. The handsets or peripheral devices place the address on the bus bit by bit and after every bit, the handset or peripheral reads the bus to determine if a higher priority unit is on the bus. Each of the handsets or peripheral devices is provided with an "open collector" bus interface. Since the highest priority units are assigned the lowest binary value, if the RD line is held low while a handset or peripheral device places a binary one on the bus, the low state of the RD line indicates that a higher priority unit is also on the bus. According to FIG. 4, handset 0001 has a higher priority than handset 0110. When handset 0110 senses that handset 0001 is also requesting service on the bus (i.e. after bit 814), it will enter a wait state until handset 0001 relinquishes control of the bus.

Figure 5:
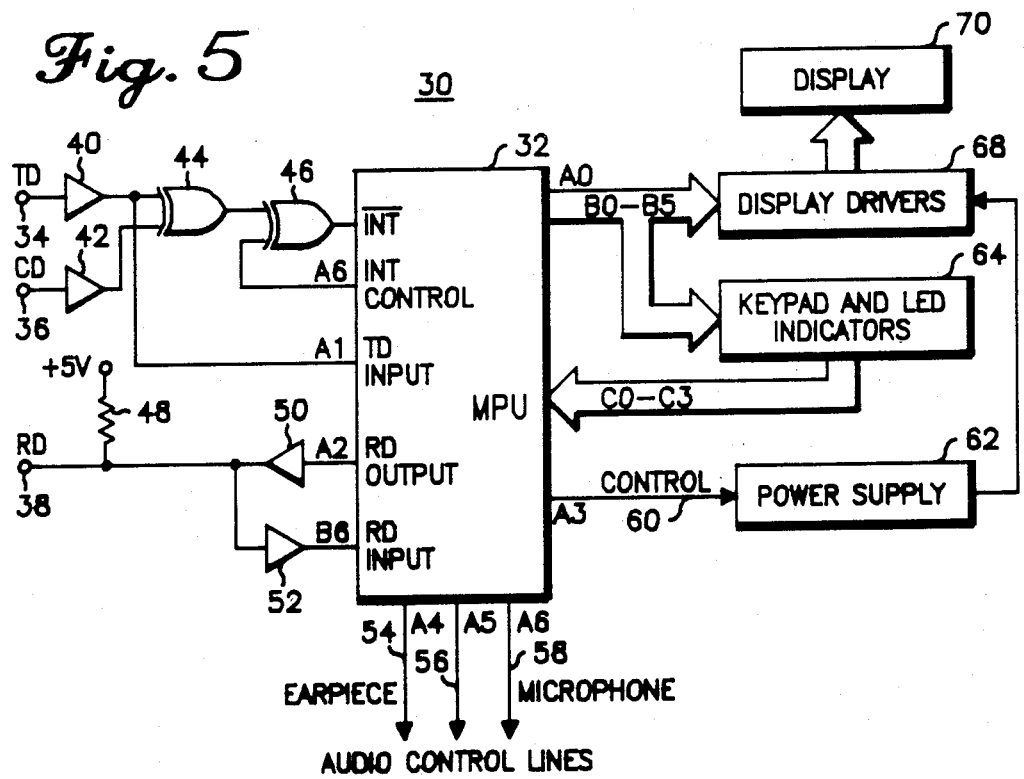
FIG. 5 is a schematic and block diagram of a handset controller of the type which may be used in accordance with the present invention.

Refering now to FIG. 5, there is shown a schematic diagram of the the handset or peripheral bus interface and control unit. The bus interface circuit comprises bus line drivers 40, 42, 50, and 52 which interface with the bus conductors TD, CD, and RD through terminals 34, 36, and 38 respectively. The RD line is additionally provided with a pull-up resistor 48 which maintains a high state on the RD line when not in use. Bus drivers 40 and 42 are coupled to EXCLUSIVE-OR gates 44 and 46 which extract clock information from the TD and CD bus lines. The bus interface circuitry is coupled to a microprocessor 32 through input ports A6 and A1 which decodes the information communicated on the bus as well as controlling the operation of the handset or peripheral unit. The microprocessor 32 can be any general purpose microprocessor circuit provided with the proper memory and interface circuitry. One microprocessor which would function properly with the present invention is designated a MC146805F2, available from Motorola Semiconductor Products Inc., 3501 Ed. Bluestein Blvd., Austin, Tex. 78721. Exclusive-OR gate 46 is coupled to the interrupt input and a interrupt control output A6 of microprocessor 32. The operation and use of exclusive-OR gates 44 and 46 is also described in the instant assignee's co-pending U.S. patent application Ser. No. 493,919, filed May 12, 1983, entitled "Microcomputer Controlled Data Receiver", invented by James L. Wilson and Shannon Edwards and incorporated herein by reference. The output of bus drivers 40, 50, and 52 are further coupled to data inputs A1, B6, and output B6 respectively of microprocessor 32. Three audio control lines 54, 56, and 58 are coupled to the data outputs A4 through A6 of microprocessor 32. The audio control lines are used to control the microphone, earpeice, and ringer of the handset or peripheral unit (not shown). The microprocessor 32 is additionally coupled to keypad and LED indicator control circuit 64 through ports B0–B5, a power supply circuit 62 through port A3, and a display driver circuit 68 through ports BO–B5. The keypad and LED indicator control circuit 64 and display driver circuit 68 provide status and control information output which is apparent to the user of the handset or peripheral unit. The power supply 62 is alternatly activated by microprocessor 32 whenever a display is required, usually when entering and calling a desired phone number. The display 70 is coupled to display drivers 68 and is used to provide a display which is apparent to the user of the handset. A suitable handset and associated radio transceiver is described in Motorola instruction manual number 68P81061E10, entitled "MCR 1200 Nordic Mobile Telephone", dated 1982 and available from Motorola Communications and Electronics, 1301 E. Algonquin Rd., Schaumburg, Ill., herein incorporated by reference.

Figure 6A:
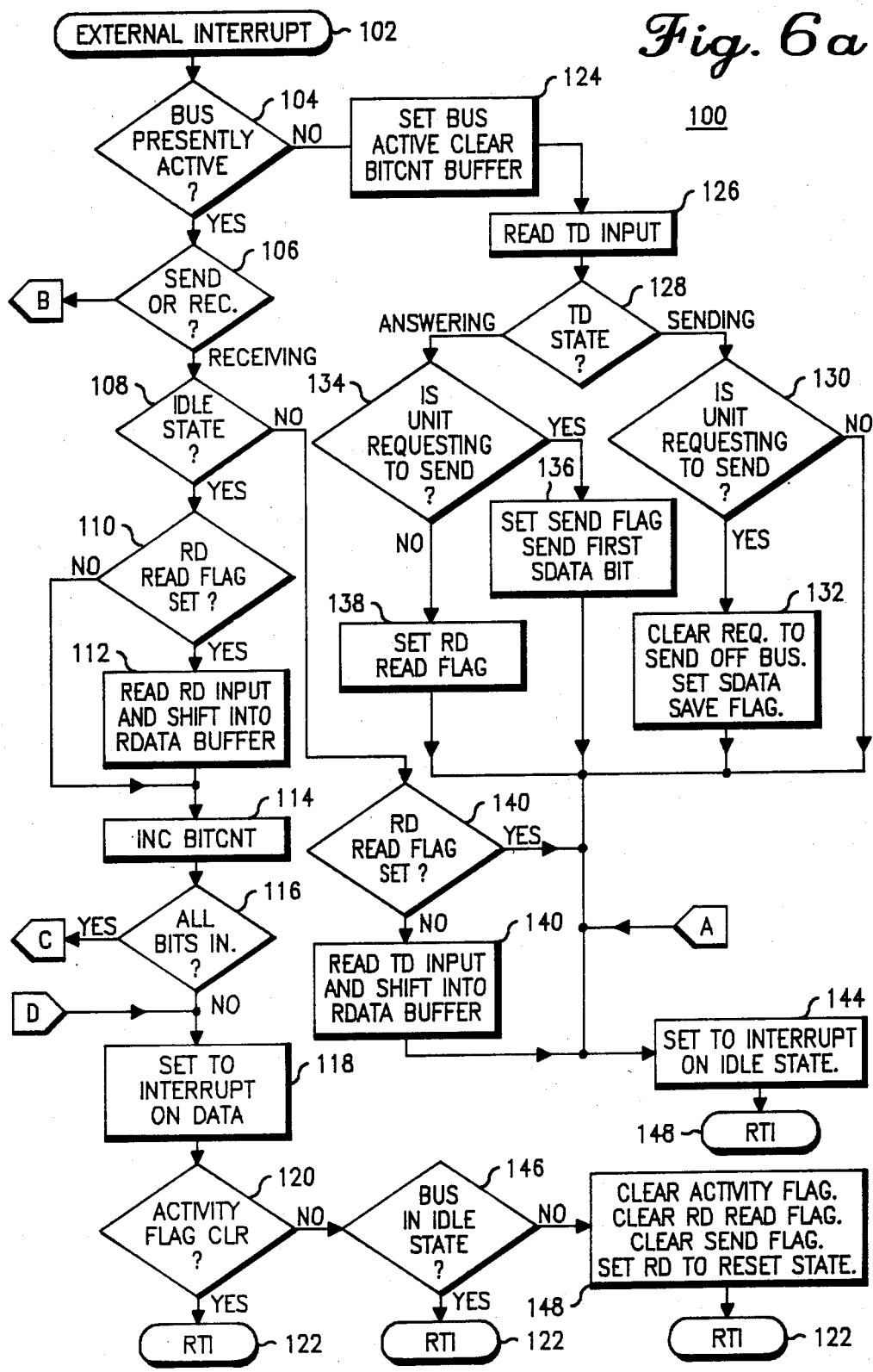
FIGS. 6a and 6b are flow diagrams detailing the operation of the handset controller of FIG. 5.
Figure 6B:
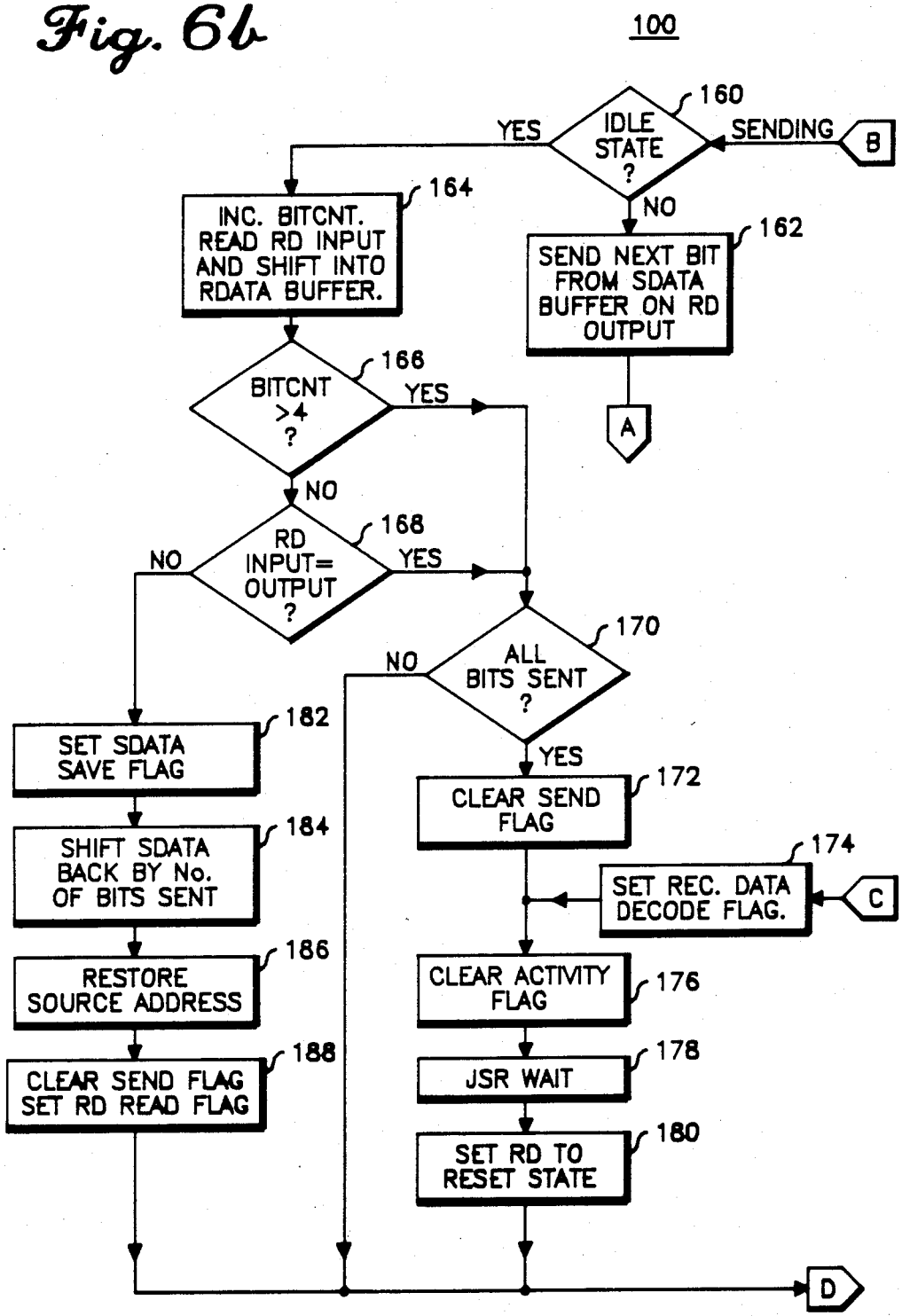

FIGS. 6a and 6b are flow diagrams which control the operation of the circuit of FIG. 5. Refering now to FIG. 6a, the operation of the circuit of FIG. 5 begins with the generation of a interrupt signal which occurs with every clock pulse detected by EXCLUSIVE-OR gates 44 and 46. Whenever an interrupt occurs, the routine 100 enters decision 104 to determine if activity is present on the bus. If activity is detected decision 106 determines whether the bus is sending or receiving data. If the unit is sending data, the routine enters segment B shown further in FIG. 6b. If the bus is receiving data the routine enters decision 108 which determines whether the bus is currently in an idle state. If an idle state is detected, decision 110 will check a RD flag which is set on the first pass through the routine. If the RD flag has been set, the routine enters item 112. Item 112 reads the RD line of the bus and shifts the data into a RAM buffer (RDATA) of microprocessor 32 of FIG. 3. If the RD flag has not been set, or after data has been shifted into the RDATA buffer, item 114 increments a counter (BITCNT) which keeps track of the number of data bits which have been entered into the RDATA register. If the appropriate number of data bits have been received, decision 116 switches program control to routine C, shown further in FIG. 6b. If all data bits have not been received, item 118 sets the microprocessor 32 to interrupt on the next received data bit. According to the principles of the present invention, an activity flag is set when the first data bit is detected on the TD/CD lines and cleared when all sixteen bits are sent or received. If the bus is not currently in an idle state, an error has occured on the bus and decision 146 selects item 148 which clears the activity flag, the RD read flag, the send flag, and sets RD to the reset state.

Returning now to decision 108, if an idle state is not indicated, decision 108 switches program control to decision 140 which examines the RD flag to determine if it has been set. If the RD flag has been set, decision 140 selects item 144 which sets the microprocessor 32 to interrupt on the next idle state. Item 144 then exits the interrupt routine. If the RD flag is not set, decision 140 selects item 142 which reads the data present on the TD bus line and shifts the data into the RDATA buffer. Item 142 then selects item 144, described above.

Returning again to decision 104, if the interupt routine 102 has been activated, and the activity flag is not set, decision 104 will select item 124 which sets the activity flag and clears the BITCNT buffer. Item 124 then selects item 126 which reads the data present on TD. Item 126 selects decision 128 which determines whether the controller TD is sending or answering. If the unit on TD is answering, decision 128 selects decision 134 which determines whether the answering unit is requesting to send data. If the answering unit is not requesting to send data, decision 134 selects item 138 which sets the RD read flag and then selects item 144 described above. If the sending unit is requesting to send data, decision 134 selects item 136 which sets a send flag, sends the first data bit, and selects item 144.

Refering now to FIG. 6b, there is shown the remainder of the flow diagram of FIG. 6a. The flow diagram of FIG. 6b begins at item B which directs the routine to decison 160. If decision 160 detects an idle state on the data bus, item 164 will be selected which increments the BITCNT buffer, reads the RD input and shifts the data bit into the RDATA buffer. Item 164 selects decision 166 which reads the BITCNT buffer. If the value stored in BITCNT is less four (indicating a device address), decision 166 selects decision 168 which determines whether a higher priority has also requested the bus. If a higher priority unit is not on the bus, decision 168 selects decision 170 which examines BITCNT to determine whether the entire message has been sent or received. If the entire message is not complete, the routine exits D to select item 118 of FIG. 6a. If the entire message has been received, decision 170 selects item 172 which clears the send flag and selects item 176. Item 176 can also be selected by item 174 which is activated through path C, which is activated through decision 116 of FIG. 6a. Item 174 is selected whenever an entire sixteen bit message has been received. Item 174 sets a received data decode flag to indicate to the microprocessor that the data packet is complete and ready for decoding. As mentioned above, item 176 is selected by item 172 and 174 after an entire message has been sent or received. Items 176 through 180 then clear the activity flag, set the RD line to a reset condition and select item 118 of FIG. 6a through path D.

Refering now to item 168, if a higher priority unit is also requesting bus service, item 168 will select item 182 which sets a send data flag (SDATA) and selects item 184. Item 184 shifts the data in the waiting unit back by the number of bits which were placed on the bus. Item 184 then selects item 186 which restores the source address and selects item 188 which clears the send flag and sets the RD flag before activating path D.

Referring now to decision 160, if an idle state is not detected, item 162 will be selected. Item 162 will select the next bit from the SDATA buffer and place it on the RD bus line before activating item 144 of FIG. 6a through path A.

Figure 7:
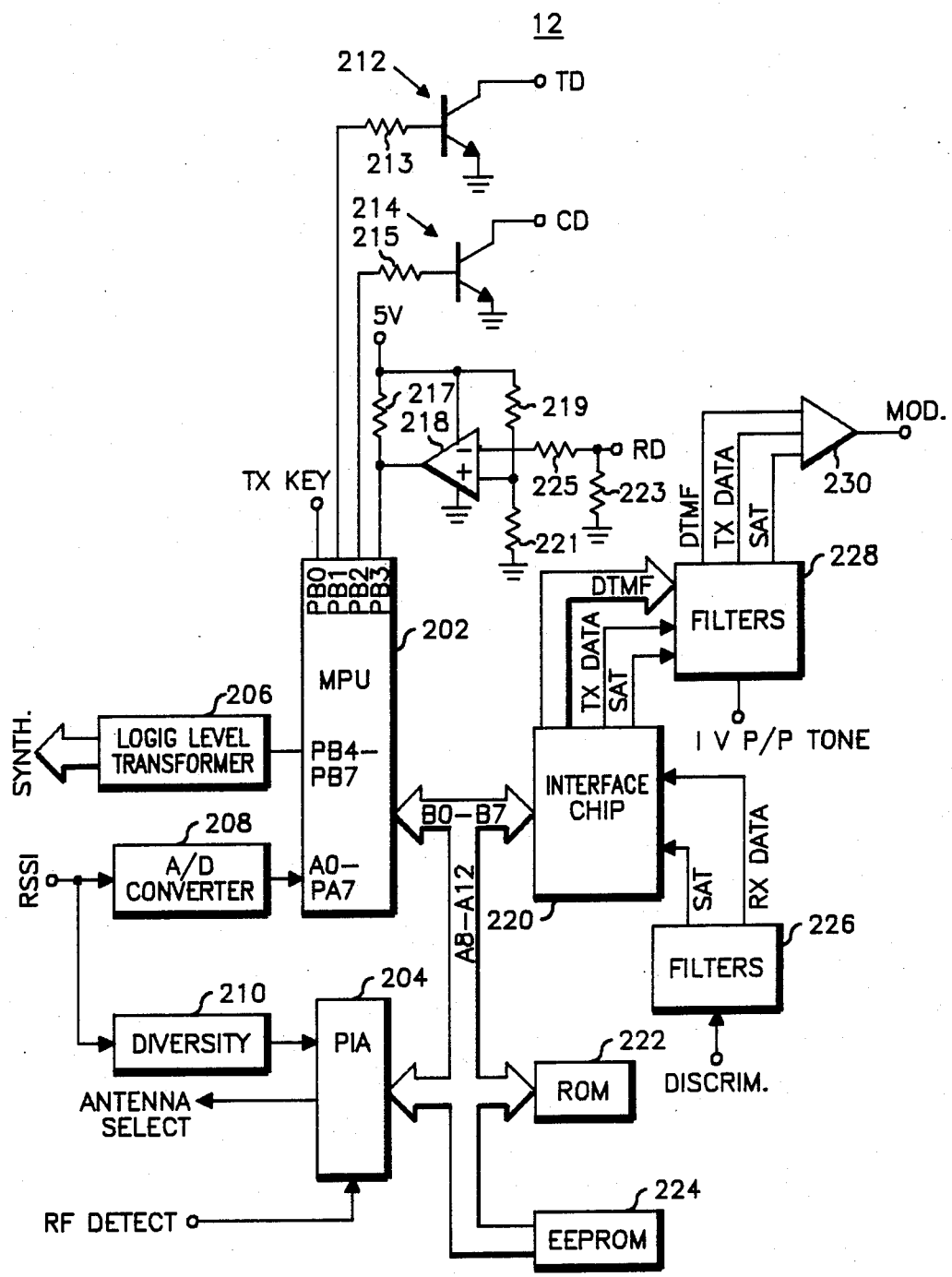
FIG. 7 is a block and schematic diagram of the bus controller of the type which would be used in accordance with the present invention.

Referring now to FIG. 7, there is shown a block diagram and electrical schematic of the bus controller 12 of FIG. 1. The bus controller comprises a microprocessor 202 which cooperates with a variety of interface circuitry further described below. The microprocessor 202 may be of the same family as the microprocessor described in FIG. 5. The microprocessor 202 interfaces with the serial bus lines through microprocessor ports PB1 through PB3. The TD bus line is coupled to the collector of a NPN transistor 212. The base of transistor is coupled to port PB1 through resistor 213. In a similar fashion, the CD bus line is coupled to port PB2 through transistor 214 and resistor 215. The RD bus conductor is coupled to port PB3 through bus driver 218 and associated resistors 217, 219, 221, 223, and 225. A transmitter key control is provided through microprocessor port PB0.

The bus controller also provides various transceiver control functions as well as controlling the operation of the telephone circuitry. The transmitter synthesizer (not shown) interfaces with the bus controller 12 through a logic level transformer 206 and microprocessor ports PB4 through PB7. Therefore, the bus controller also directly controls the transmitter frequency of the vehicular communications unit. The receiver of the vehicular communication unit interfaces with the microprocessor 202 through an A/D converter 208, PIA 204 and a diversity controller 210. The output of the receiver (not shown) detector is coupled to microprocessor 202 through the PIA 204. Signal quality information, in the form of a receiver signal strength indicator (RSSI) is copuled to the microprocessor 202 through A/D converter 208 and diversity network 210. The microprocessor 202 processes the receiver signal quality inforamation and selects alternate antennas through PIA 204. The microprocessor 202 is coupled to the PIA 204 through ports B0-B7 and ports A8-A12. Microprocessor 202 is further coupled to a ROM 222 and a EEPROM 224 through the same microprocessor ports. The ROM and EEPROM contain the program information required to operate the microprocessor 202. In addtion, microprocessor 202 is coupled, through the abovementioned ports, to a interface circuit used to generate such signals as dialing tones as well as providing transmitter control signals. The interface circuit is further coupled to filter circuits 226 and 228 which provide a means of coupling the receiver and transmitter circuits to the microprocessor 202. The exact operation of the bus controller 12 is described in detail in a Motorola instruction manual entitled "DynaT.A.C. cellular Mobile Telephone", number 68P81066E40 and available from Motorola Communications and Electronics, 1301 Algonquin Rd., Schaumburg Ill. to be published May, 1984.

Figure 8:
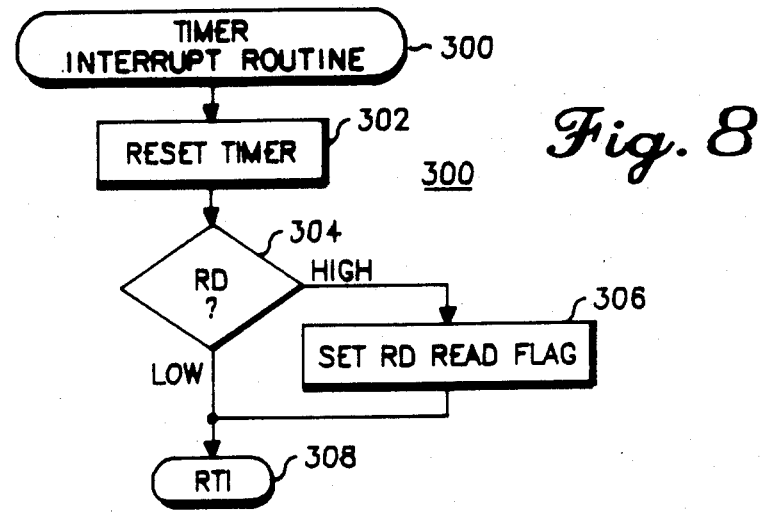
FIGS. 8 through 10 are flow diagrams detailing the operation of the bus controller of FIG. 7.
Figure 9:
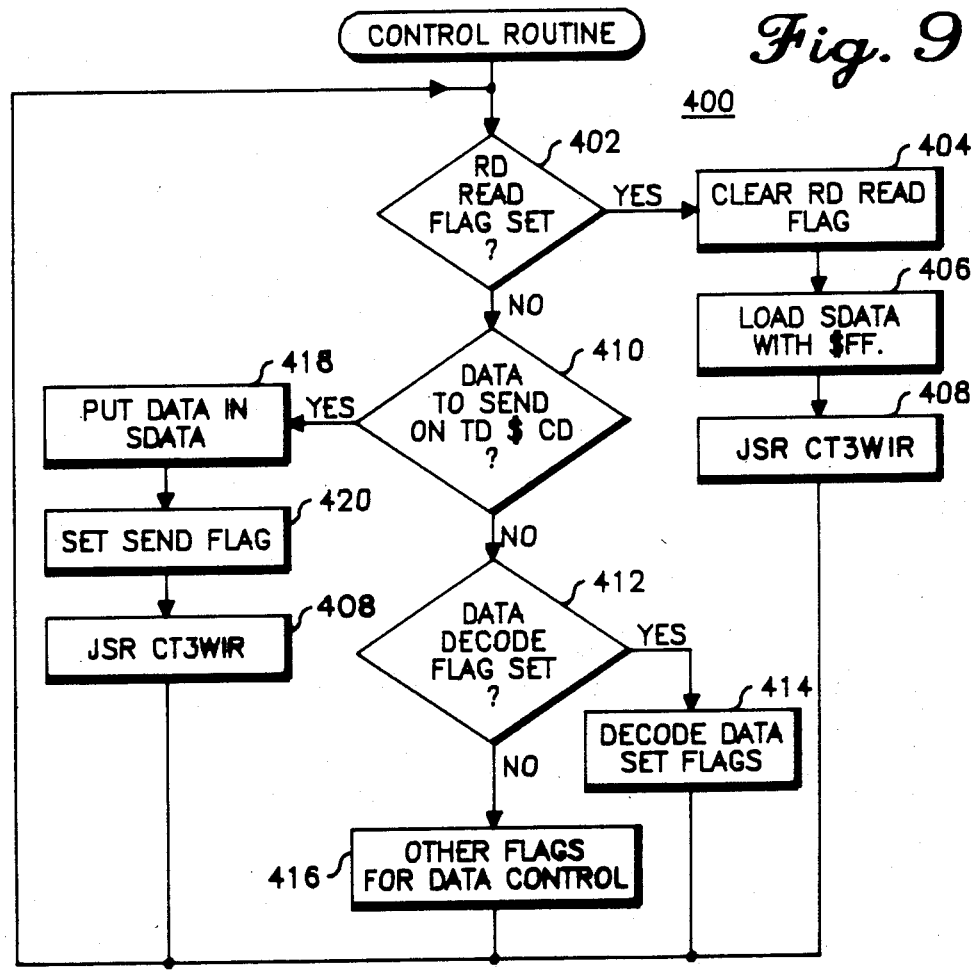
Figure 10:
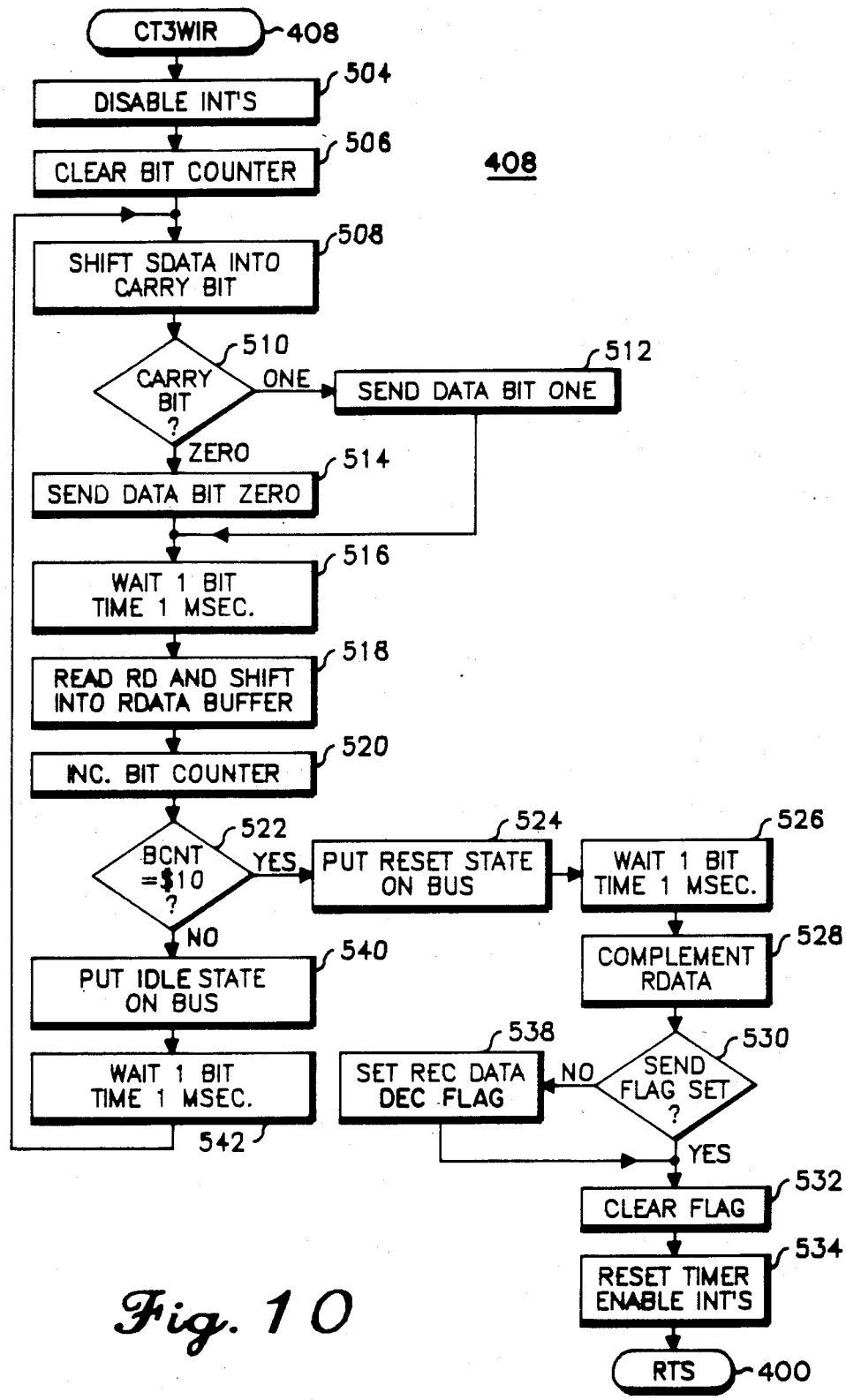

Refering now to FIGS. 8, 9 and 10 there is shown a group of flow diagrams which define the operation of the bus controller 12 of FIG. 7. FIG. 8 details the operaton of a timer interrupt routine 300 which is activated every 1 ms by an internal timer. Routine 300 causes the bus controller 12 to check the RD conductor of the serial data bus on a regular basis for activity on the bus. The timer interrupt routine 300 begins with item 302 which is activated at the end of the 1 ms time period. Item 302 then selects decision 304 which examines the RD bus conductor for any activity. If no activity is detected, the timer routine exits to the previous routine operating before the timer routine was activated. If bus activity is detected, decision 304 selects item 306 which sets the RD read flag before exiting the timer routine.

Refering now to FIG. 9, there is shown the basic operating background routine 400 which defines the operation of the bus controller 12 of FIG. 7. The control routine 400 begins with decision 402 which examines the RD flag to determine whether activity has been detected on the bus. If activity is present on the bus, and the RD flag is set, a handset or peripheral unit is requesting service of the bus, and therefore requires clocking to effect the transmission of its data. Therefore, decison 402 selects item 404 which clears the RD flag and selects item 406. Item 406 loads a send data buffer (SDATA) with sixteen bits corresponding to binary ones, which will be shifted onto the bus one by one to generate clocking on the bus. Item 406 then selects item 408 which activates the three wire bus control routine (CT3WIR) 502 of FIG. 10. If the RD flag has not been set, decision 402 will select decision 410 which determines whether the bus controller is to send data on the TD and CD bus lines. If the bus controller 12 is to place data on the bus, decision 410 selects item 418 which shifts the required data bits into the SDATA register and selects item 420. Item 420 sets a send flag and selects item 420. Item 420 then selects item 408 which activates the CT3WIR routine shown in FIG. 10. Refering again to decision 410, if the bus controller is not to send data, decision 410 selects decision 412 which examines a decode flag to determine whether the bus controller is to decode a subsequent message. The data decode flag is set by item 538 of FIG. 10 below. If the bus controller is to decode data, decision 412 selects item 414 which decodes the message and clears the data decode flag. If the data decode flag is not set, decision 412 selects 416 which examines the other flags to determine whether other data control operation is required. Item 416 then returns program control to the beginning of the control routine 416.

Refering now to FIG. 10, there is shown the three wire bus control routine CT3WIR mentioned hereinabove. CT3WIR is activated whenever the bus controller 12 of FIG. 7 is to place data or clocking information on the bus. The CT3WIR routine begins with item 504 which disables the microprocessor interrupts to prevent the bus controller routine from stopping in the process of decoding or clocking the bus. Item 506 then clears the bit counter so it may keep track of the length of the current message. Item 508 then shifts the contents of SDATA into a carry bit location so SDATA can be shifted onto the bus bit by bit. Decision 510 examines the carry bit. If the carry bit is a binary one, decision 510 selects item 512 which places a binary one on the bus in accordance with the three wire bus data transmission scheme. If the carry bit is a zero, decision 510 will select item 514 which places a binary zero on the bus in accordance with the three wire bus routine. Items 512 or 514 then select item 516 which generates a delay of 1 ms of the equivalent to the transmission time for one bit. Item 516 then selects item 518 which reads any data present on RD and shifts that bit into the RDATA buffer. Item 518 then increments the bit counter and selects decision 522. Decision 522 examines the bit counter to determine whether the entire sixteen bit message has been communicated on the bus. If not, decision 522 selects item 540 which generates an idle state on the bus. Item 542 then generates a 1 ms time delay before returning program control to item 508 mentioned above. If the entire sixteen bit message has been received, decision 522 selects item 524 which generates a reset state on the bus. Item 526 then generates a 1 ms time delay before selecting item 528 which inverts the data received on RD. Decision 530 then examines the send flag which is set by item 420 of FIG. 9. If the send flag is not set, data on RD is to be decoded, therefore, item 538 sets the data decode flag before selecting item 532. Item 532 is also selected if decision 530 did not detect a set send flag. Items 532 and 534 then reset the bus controller for the next message by clearing the send flag, resetting the interrupt timer, enabling the interrupts, and returning program control to the control routine 400 of FIG. 9.

In summary, a multiple user three wire serial data bus has been described. The multiple user serial data bus allows for communication between a number of peripheral units or a bus controller while also providing a means of arbitration if several units request service substantially simultaneously. Clocking information is extracted from the data lines of the three wire serial data bus and is present on an as required basis. Accordingly other uses and embodiments will be apparant to one skilled the art without departing from the spirit and scope of the present invention.

What claimed is:
1. A data communications system, comprising:
   (a) a serial data bus including at least first and second conductors;
   (b) a plurality of peripheral units each having a multi-bit pre-assigned address indicative of a pre-assigned priority and including means coupled to said serial data bus for placing a first bit of its pre-assigned address on said first conductor and the remaining bits of its pre-assigned address on said first conductor in response to clocking information on said second conductor, means for detecting addresses placed on said first conductor, and means for releasing said first conductor in response to detection of an address having a having priority than its pre-assigned address; and
   (c) a bus control unit coupled to said serial data bus for detecting peripheral unit addresses placed on said first conductor and placing the clocking information on said second conductor in response thereto.

2. The data communication system according to claim 1, wherein said serial data bus further includes a third conductor, said bus control unit being coupled to said second and third conductors for placing a read/write bit, the pre-assigned address of a destination peripheral unit, and an information word on the second and third conductors according to a predetermined signalling scheme, and said peripheral units each including means coupled to said second and third conductors for detecting said read/write bit, its pre-assigned address in response to detection of said read/write bit, and the information word in response to detection of its pre-assigned address.

3. The dat communication system according to claim 1, wherein said bus control unit has a pre-assigned multi-bit address indicative of the highest priority.

4. A peripheral unit coupled by a serial data bus to a control unit of a data communications system, each peripheral unit having a multi-bit pre-assigned address indicative of a pre-assigned priority, said serial data bus including at least first and second conductors, and said bus control unit coupled to said serial data bus for detecting peripheral unit addresses placed on said first conductor and placing clocking information on said second conductor in response thereto, said peripheral unit comprising:

means coupled to said serial data bus for placing a first bit of its pre-assigned address on said first conductor and the remaining bits of its pre-assigned address on said first conductor in response to the clocking information on said second conductor;

means for detecting addresses placed on said first conductor;

and means for releasing said first conductor in response to detection of an address having a higher priority than its pre-assinged address.

5. A data communications system, comprising:
(a) a serial data bus including at least first, second and third conductors;
(b) a plurality of peripheral units each having a multi-bit pre-assigned address indicative of a pre-assigned priority and including means coupled to said serial data bus for placing a first bit of its pre-assigned address on said first conductor and the remaining bits of its pre-assigned address on said first conductor in response to clocking information on at least one of said second and third conductors, means for detecting addresses placed on said first conductor, and means for releasing said first conductor in response to detection of an address having a higher priority than its pre-assigned address; and
(c) a bus control unit coupled to said serial data bus for detecting peripheral unit addresses placed on said first conductor and placing the clocking information on said one of said second and third conductors in response thereto.

6. The data communication system according to claim 5, wherein said bus control unit is coupled ot said second and third conductors for placing a read/write bit, the pre-assigned address of a destination peripheral unit, and an information word on the second and third conductors according to a predetermined signalling scheme, and said peripheral units each including means coupled to said second and third conductors for detecting said read/write bit, its pre-assigned address in response to detection of said read/write bit, and the information word in response to detection of tis pre-assigned address.

7. The data communication system according to claim 5, wherein said bus control unit has a pre-assigned multi-bit address indicative of the highest priority.

8. A peripheral unit coupled by a serial data bus to a control unit of a data communications system, each peripheral unit having a multi-bit pre-assigned address indicative of a pre-assigned priority, said serial data bus including at least first, second and third conductors, and said bus control unit coupled to said serial data bus for detecting peripheral unit addresses placed on said first conductor and placing clocking information on at least one of said second and third conductors in response thereto, said peripheral unit comprising:

means coupled to said serial data bus for placing a first bit of its pre-assigned address on said first conductor and the remaining bits of its pre-assigned address on said first conductor in response to the clocking information on said one of said second and third conductors;

means for detecting addresses placed on said first conductor;

and means for releasing said first conductor in response to detection of an address having a higher priority than its pre-assigned address.

9. A method for controlling access to a serial data bus having at least first and second conductors for coupling a bus control unit to a plurality of peripheral units each having a multi-bit pre-assigned address indicative of a pre-assigned priority, said bus control unit coupled to said serial data bus for detecting peripheral unit addresses placed on said first conductor and placing clocking information on said second conductor in response thereto, said method of access for each peripheral unit comprising the steps of:
(a) placing a first bit of the pre-assigned address on the first conductor to request service;
(b) placing the remaining bits of the pre-assigned address on the first conductor in response to clocking information on the second conductor from the bus control unit;
(c) monitoring the first conductor to detect the address of a higher priority peripheral device; and
(d) releasing the first conductor if a higher priority peripheral device has requested service on the bus.

10. The method according to claim 9, wherein said placing step (c) further includes the steps of:
placing bits of the pre-assigned address of a destination peripheral unit on the first conductor; and
placing bits of an information word on the first conductor.

11. The method according to claim 10, further including for each peripheral unit not accessing the serial data bus the steps of:
monitoring the first conductor to detect its pre-assigned address; and
detecting the information word on the first conductor in response to detection of its pre-assigned address.

12. The method according to claim 9, wherein said bus control unit has a pre-assigned multi-bit address indicative of the highest priority.

13. The method according to claim 9, further including the steps of:
for said bus control unit:
placing a read/write bit on the second conductor to indicate information will follow from said bus control unit;
placing bits of the pre-assigned address of a destination peripheral unit on the second conductor; and
placing bits of an information word on the second conductor; and
for each peripheral unit not accessing the serial data bus:
monitoring the second conductor to detect said read/write bit;
monitoring the second conductor to detect its pre-assigned address in response to detection of said read/write bit; and
detecting the information word on the second conductor in response to detection of its pre-assigned address.

* * * * *